Oct. 28, 1969  D. J. AISANICH  3,475,594
ELECTRICALLY HEATED GLASS PANEL WITH ANTI-SHOCK
CONTROL CIRCUIT HAVING ELECTRONIC SWITCHES
Filed Aug. 16, 1967  2 Sheets-Sheet 1

INVENTOR
Daniel J. Aisanich
by McDougall, Hersh, Scott
and Ladd
Att'ys

United States Patent Office 3,475,594
Patented Oct. 28, 1969

3,475,594
ELECTRICALLY HEATED GLASS PANEL WITH ANTI-SHOCK CONTROL CIRCUIT HAVING ELECTRONIC SWITCHES
Daniel J. Aisanich, Chicago, Ill., assignor to Ardco, Inc., Chicago, Ill., a corporation of Illinois
Filed Aug. 16, 1967, Ser. No. 661,023
Int. Cl. H05b 1/02, 3/16, 3/06
U.S. Cl. 219—509      26 Claims

ABSTRACT OF THE DISCLOSURE

An electrical heating apparatus having an electrically heated glass panel and a protective control circuit. The control circuit having an electronic switch for effectively disconnecting the electric power from the electrically heated glass panel when breakage occurs, to obviate any shock hazard.

---

This invention relates to electrically heated glass panels and pertains particularly to control devices for obviating any electrical shock hazard when such glass panels are accidentally broken. The invention is also applicable to other similar protective control devices.

An electrically heated glass panel generally comprises a plurality of parallel panes of glass. However, in some cases, the panel may comprise a single pane. An electrical heating element is provided to heat the glass. Generally, the heating element is in the form of an electrically conductive coating, layer or the like on one of the inaccessible surfaces of one of the panes. The glass panel is heated by causing an electrical current to pass through the electrically conductive coating. Electrically heated glass has many applications but is particularly useful for refrigerator doors. Display type refrigerator doors, utilizing electrically heated glass, are frequently employed on refrigerated cabinets and compartments for supermarkets and other stores, to hold frozen foods, ice cream, dairy products, beverages, and other commodities which require refrigeration. The electrical heating of the glass prevents condensation of moisture on the glass. Unless electrically heated glass is used, such condensation tends to occur under conditions of high atmospheric humidity even though the glass is of the insulating type having a pair of parallel panes with dead air spaces therebetween. Under normal conditions electrically heated glass does not present any shock hazard, because the heating element is between the panes of glass and is inaccessible. However, if breakage of the glass occurs due to some accident, the electrically conductive coating, or other heating element, may become accessible to the touch so that an electrical shock hazard may possibly exist.

The general object of the present invention is to deal with the problem of obviating any such shock hazard when electrically heated glass is accidentally broken.

A further object is to provide a new and improved control device in which the electrical power is effectively disconnected from the electrically heated glass by an electronic switch, when breakage of the glass occurs. The supply of power may be disconnected entirely, or may be so diminished by the electronic switch that no shock hazard will exist.

In accordance with the present invention, the electronic switch preferably comprises a solid state electronic semiconductor device, such as a silicon controlled rectifier. The main electrodes of the electronic switch are connected in a load circuit with the heating element. A control circuit is connected to the control electrode or gate of the electronic switch. When normal load current flows through the heating element, the gate is biased so that the electronic switch is conductive. The arrangement is preferably such that the breakage of the heating element changes the bias so that the electronic switch is rendered nonconductive. The bias is preferably derived from the power line from which the heating element is energized.

Further objects and advantages of the present invention will appear from the following description, taken with the accompanying drawings, in which.

Figure 1:
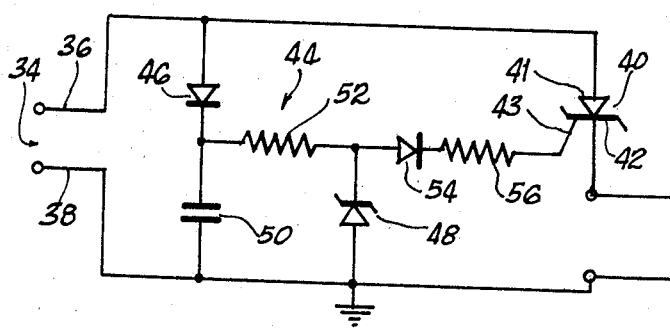
FIG. 1 is a circuit diagram showing an anti-shock control device or circuit to be described as one illustrative embodiment of the present invention.

As illustrated in FIG. 1, the invention is embodied in an anti-shock control device or circuit 10 which is employed to control the supply of electrical power to an electrically heated glass panel 12. The invention may also be applied to other similar control devices. Electrically heated glass panels are applicable to refrigerators of all kinds, both domestic and commercial and to various other types of equipment, but are particularly valuable for display type refrigerators to be employed to hold merchandise in supermarkets and other stores. Thus, the illustrated panel 12 is mounted in a display refrigerator door 14, which may be of the general type disclosed and claimed in the Kurowski Patents Nos. 2,987,782 and 3,131,421.

The illustrated glass panel 12 comprises three parallel panes 16, 17 and 18 with spacers 19 and 20 between the edge portions thereof. However, the panel may comprise more or less than three panes. Thus, the panel may have one, two, four or even more panes of glass.

The edges of the illustrated panes 16, 17 and 18 are enclosed by a channel-shaped member 22. Insulating spaces 24 and 25 are provided between the panes 16–18. Normally, the spaces 24 and 25 are filled with dry air which provides good heat insulation and obviates any condensation of moisture within the spaces. The door 14 comprises a frame 26, preferably made of metal, in which the glass panel 12 is mounted. Removable moldings 27 may be employed to retain the panel 12 in the frame 26.

The glass panel 12 is adapted to be heated by an electrical heating element, which preferably takes the form of an electrically conductive coating or layer 28 on one of the inaccessible surfaces of the panes 16–18. Such coatings will be known to those skilled in the art. The coating 28 is preferably transparent so that it does not interfere with visibility through the glass panel. The coating 28 may be intimately bonded or fused to the glass pane. In the illustrated construction, the conductive coating 28 is on the rear or inner surface of the front pane 16.

Suitable leads 30 and 32 are connected to the conductive coating 28 adjacent the opposite edges of the glass panel 12. The leads 30 and 32 are brought out of the door so that electrical power may be supplied to the heating element.

The circuit for deriving the electrical power comprises a power line 34, comprising line wires 36 and 38. The power line 34 is adapted to receive alternating current at 110 volts and 60 cycles or any other suitable voltage and frequency.

The anti-shock control device 10 is connected between the power line 34 and the heating element 28, and is effective to supply adequate electrical power to the heating element during normal operation, so that the glass will be heated to prevent condensation of moisture on the glass. In the event that the glass panel 12 is broken, due to some accident, the control device 10 effectively disconnects the electrical power from the glass panel 12, so that no shock hazard will exist, even though the broken edges of the conductive coating 28 are accessible to the touch.

In the illustrated control device 10, the supply of electrical power is controlled by an electronic switching element 40. Various types of electronic switches may be employed, including electronic tubes and semi-conductor devices. By way of example, FIG. 1 illustrates a preferred arrangement in which the electronic switching element 40 comprises a silicon controlled rectifier, which is one well known type of electronic semi-conductor device. The silicon controlled rectifier 40 has main electrodes, comprising an anode 41 and a cathode 42, and a control electrode or gate 43.

It will be seen that the silicon controlled rectifier 40 and the heating element 28 are connected in series across the power line 34. In this case, the power line wire 38 is grounded and is connected to one side of the heating element 28. The other side of the heating element is connected to the cathode 42 of the rectifier 40, while the anode 41 is connected to the line wire 36. With this arrangement, only the positive pulses of the alternating current are supplied to the heating element 28. However, an arrangement could be provided in which both the positive and negative pulses would be supplied.

The silicon controlled rectifier 40 is of the type which is essentially non-conductive, in the absence of any bias on the control electrode or gate 43. The rectifier 40 is rendered conductive by the application of a positive bias between the gate 43 and the cathode 42.

In the illustrated control device 10, a positive biasing current is caused to flow between the gate 43 and the cathode 42 during normal operation, with the result that the rectifier 40 is conductive so that normal load current will flow through the heating element 28. The biasing current is caused to flow through the heating element 28. If an open circuit develops in the heating element 28 due to breakage or otherwise, the biasing current is interrupted, with the result that the silicon controlled rectifier 40 becomes non-conductive. In its non-conductive state, the rectifier 40 has a very high resistance, so that only a minute leakage current can flow through the rectifier. This leakage current does not present any shock hazard. Thus, a person who may accidentally touch the broken heating element 28 will not receive any appreciable shock.

The biasing voltage for the silicon controlled rectifier 40 is preferably derived from the power line 34. For this purpose the illustrated control device 10 comprises a bias supply 44, in which the biasing voltage is produced by a diode rectifier 46, and is developed across a Zener diode 48 which stabilizes the biasing voltage. The diode 46 is arranged to charge a capacitor 50. Thus, the diode 46 and the capacitor 50 are connected in series between the power line wires 36 and 38. The voltage which develops across the capacitor 50 is applied to the Zener diode 48 through a current limiting resistor 52. Typically, the voltage which develops across the Zener diode 48 is quite low, only a small fraction of the power line voltage.

The voltage across the Zener diode 48 is applied to the silicon controlled rectifier 40 through the heating element 28. Thus, one side of the Zener diode 48 is connected to the cathode 42 of the rectifier 40 through the heating element 28. In the illustrated arrangement, the other side of the Zener diode is connected to the control electrode or gate 43 through a diode 54 and a current limiting resistor 56.

During the normal operation of the anti-shock control device 10 of FIG. 1, a sufficient biasing voltage is developed between the gate 43 and the cathode 42 of the silicon controlled rectifier 40 to maintain the rectifier in a conductive state. When the rectifier 40 is conductive, the resistance between the anode 41 and the cathode 42 is very low, so that normal load current flows through the rectifier 40 to the heating element 28.

The biasing current between the gate 43 and the cathode 42 also flows through the heating element 28. In the event that the heating element is broken, the biasing current is interrupted, with the result that the silicon controlled rectifier 40 is switched to its non-conductive state. The resistance between the anode 41 and the cathode 42 is then very high, so that only a minute leakage current can flow, if a person accidentally touches the broken heating element. The leakage current is insufficient to cause any appreciable shock. Thus, there is no shock hazard.

Figure 2:
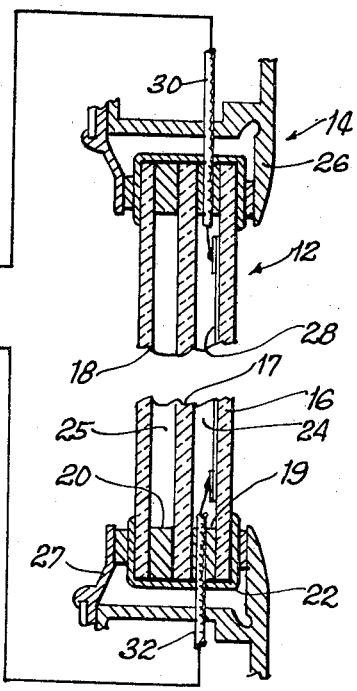
FIG. 2 is a graph or curve which illustrates the operating characteristics of the anti-shock device of FIG. 1.
Figure 2:
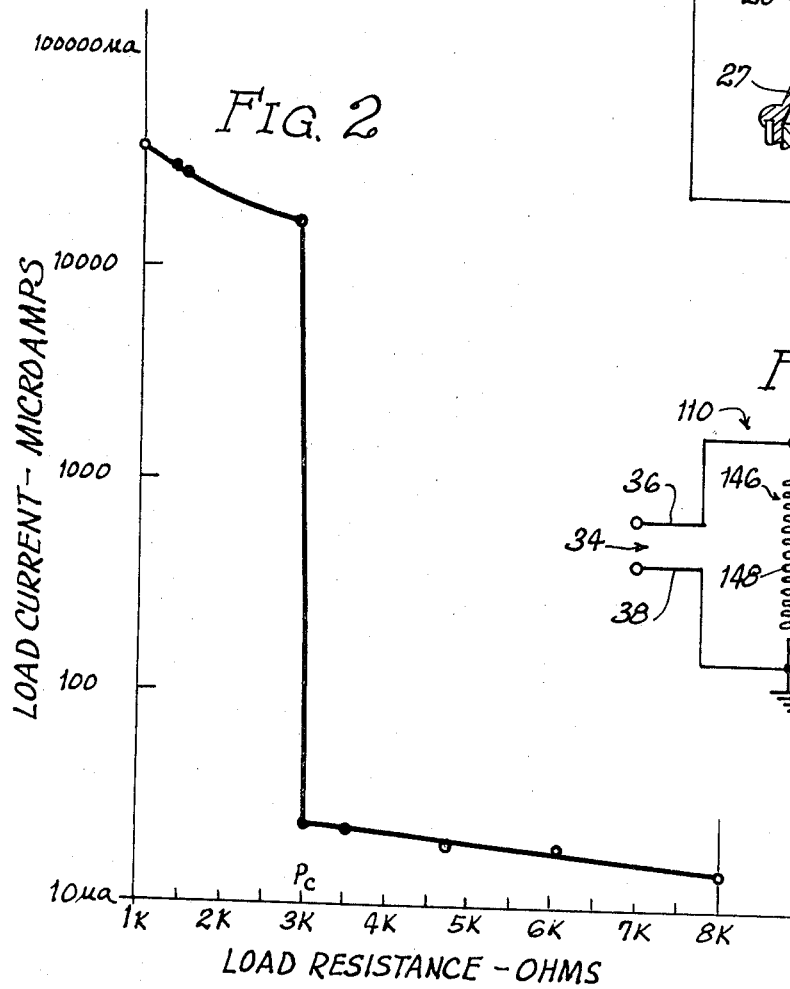

The operation of the anti-shock control device 10 is graphically illustrated in FIG. 2, which shows the changes in the load current when the load resistance is varied. When the load resistance is low, the load current is high. This represents the normal operating condition, in which normal load current is supplied to the heating element 28. If the load resistance is increased above a certain critical value, which is about 3,000 ohms in the illustrated example, the load current drops to an extremely low value, representing the minute leakage current which is all that can flow through the silicon controlled rectifier 40 when it is in a non-conductive state.

For a load resistance of 1,000 ohms, which is an example of a normal operating condition, the load current is shown as about 35,000 microamperes. For a load resistance of 3,000 ohms or higher, the load current drops to less than 30 microamperes, which is insufficient to cause any shock hazard.

It will be understood by those skilled in the art that the values of the components employed in FIG. 1 may be varied in accordance with the specific results to be achieved. Merely by way of example, it may be helpful to add that the curve of FIG. 2 represents the results of a test in which the components were of the following values or types:

Silicon controlled rectifier General Electric Type C106B2. 40.
Diode 48 _____ 3.3 volt Zener diode.
Diode 46 _____ Type 1 N 645.
Capacitor 50 _____ 0.1 microfarad.
Resistor 52 _____ 30,000 ohms.
Diode 54 _____ Type 1 N 645.
Resistor 56 _____ 47,000 ohms.

Figure 3:
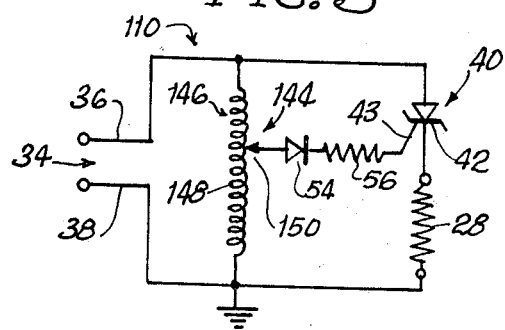
FIG. 3 is a circuit diagram of a modified anti-shock control device, constituting a second embodiment of the invention.

FIG. 3 illustrates a modified anti-shock control device 110 which differs from the device 10 of FIG. 1, in that the bias supply 44 is replaced with a modified bias supply 144. Thus, the biasing voltage is developed by a transformer 146, which replaces the components 46, 48, 50 and 52 of FIG. 1. The illustrated transformer 146 is of the auto-transformer type, having a single winding 148 with a tap 150. The winding 148 is connected across the power line 34. As shown, the diode 54 and the resistor 56 are connected between the tap 150 and the gate 43 of the silicon controlled rectifier 40. In this case, the biasing current flows from the tap 150, through the diode 54 and the resistor 56 to the gate 43, through the rectifier 40 between the gate 43 and the cathode 42, and through the heating element or load 28 to the grounded side of the transformer winding 148.

During normal operation the biasing current is sufficient to maintain the silicon controlled rectifier 40 in a conductive state. If the heating element 28 is broken, the biasing current is interrupted, with the result that the rectifier 40 becomes non-conductive.

Figure 4:
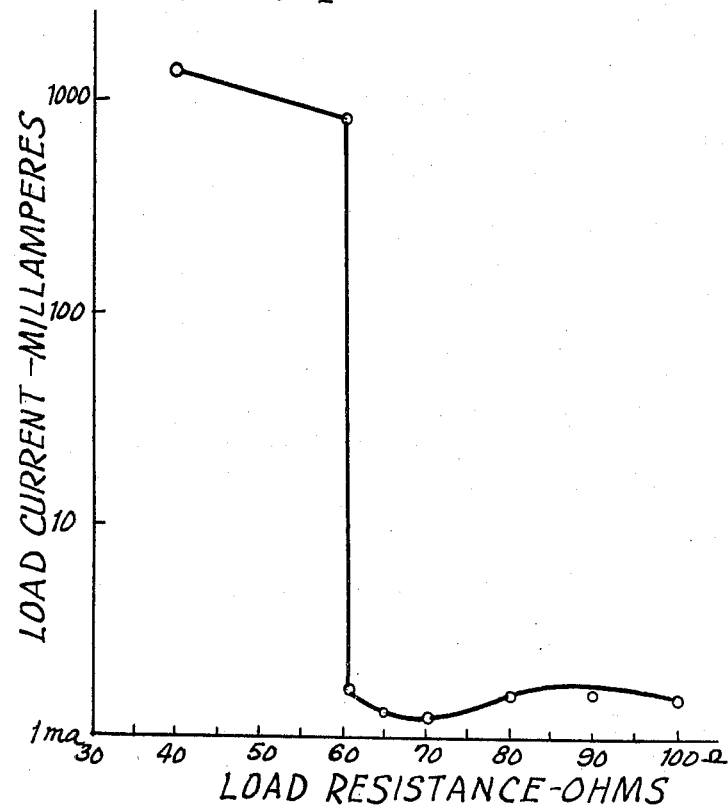
FIG. 4 is a graph illustrating the operating characteristics of the anti-shock device of FIG. 3.

FIG. 4 shows a graph which illustrates the changes in the load current when the load resistance is increased. When the load resistance is about 40 ohms, for example, the load current is somewhat greater than 1,000 milliamperes. This represents the normal operating condition, in which the silicon controlled rectifier is conductive. When the load resistance is increased above about 60 ohms, the load current drops to only a little greater than 1 milliampere. This represents the non-conductive state of the silicon controlled rectifier. Such a small leakage current is insufficient to cause any shock hazard.

By way of example, it may be helpful to add that the graph of FIG. 4 represents a test in which the components of FIG. 3 have the following values and type designations:

Silicon controlled rectifier Motorola type MCR 1604. 40.
Diode 54 _____ Type 1 and 1217.
Resistor 56 _____ 1,500 ohms.
Auto-transformer 146 __ Tape adjusted to deliver about 1.5 volts.

Those skilled in the art will realize that the values of the components may be varied to suit different operating conditions. The tap on the auto transformer 146 is illustrated as being variable, but it may be fixed.

Figure 5:
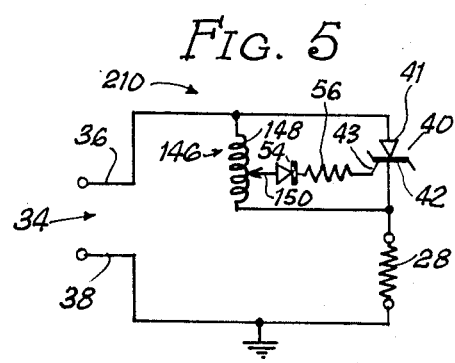
FIG. 5 is a circuit diagram of still another anti-shock control device constituting a third embodiment of the invention.

FIG. 5 illustrates another modified embodiment of the invention in the form of an anti-shock control device 210, which is quite similar to the device 110 of FIG. 3, but differs in that the auto-transformer 146 is connected across the silicon controlled rectifier 40, rather than across the power line 34. Thus, one end of the winding 148 is connected to the anode 41, while the other end of the winding is connected to the cathode 42. As before, the tap 150 is connected to the control electrode or gate 43 through the diode 54 and the resistor 56.

Figure 6:
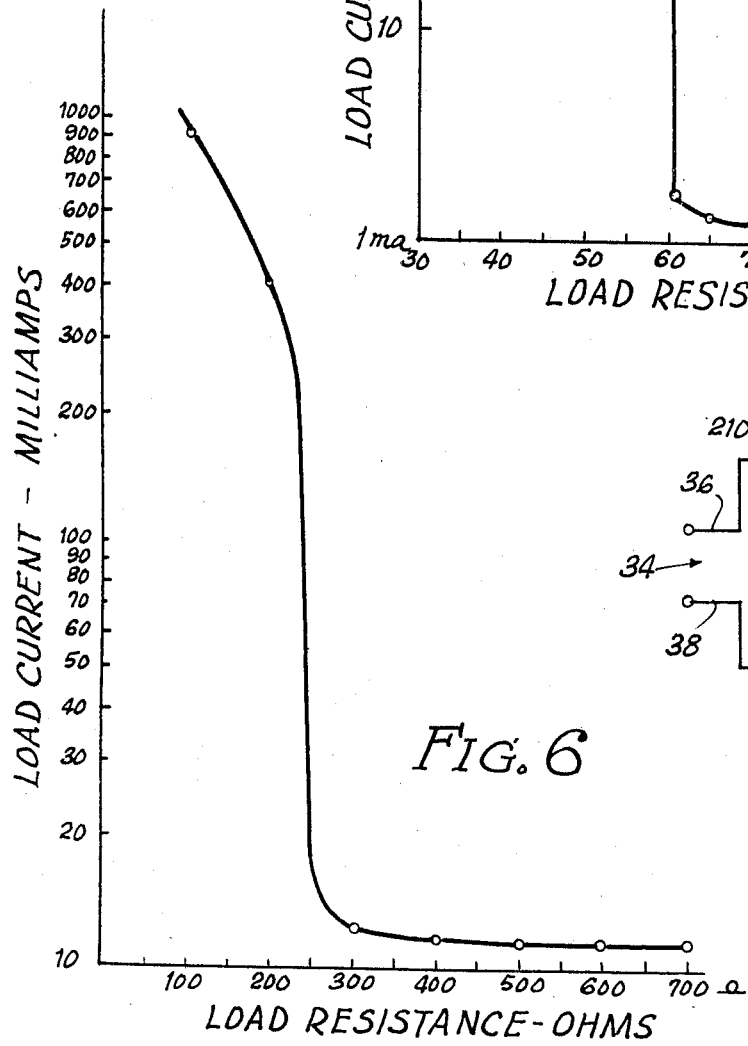
FIG. 6 is a graph illustrating the operating characteristics of the anti-shock device of FIG. 5.

FIG. 6 shows a graph which illustrates the changes in the load current when the load resistance is varied. Thus, for example, the load current is about 900 milliamperes for a load resistance of 100 ohms. For load resistances above about 300 ohms the load current drops to only a little more than 10 milliamperes. This is insufficient to cause a serious shock hazard. However, the load current is greater than before, because a component of the load current flows directly through the winding 148 of the auto-transformer 146.

During normal operation, the auto-transformer 146 supplies a sufficient biasing current to the gate 43 to maintain the silicon controlled rectifier 40 in a conductive state. If an open circuit condition develops in the load resistance 28, due to breakage or otherwise, the biasing current drops to zero, due to the loss of supply voltage across the transformer winding 148. Thus, the rectifier 40 is switched to a non-conductive state. With the arrangement of FIG. 5, the breakage of the heating element or load resistance 28 interrupts the biasing current by effectively disabling the bias supply. However, in this case it is the input or primary current to the bias supply transformer 146 which is interrupted by the breakage of the heating element, rather than the secondary or output current, as in the case of the anti-shock device 110 of FIG. 3.

Each of the illustrated anti-shock control devices employs an electronic switch which is normally biased to a conductive state so that normal power is supplied to the heating element or other load resistance. When an open circuit develops in the heating element, due to breakage or otherwise, the bias is interrupted, with the result that the electronic switch lapses into a non-conductive state.

The action of the electronic switch is virtually instantaneous, so that the supply of power is effectively disconnected from the heating element, within a matter of microseconds after breakage of the heating element occurs. There is no substantial lapse of time during which a shock hazard might exist.

Moreover, the starting action of the electronic switch is virtually instantaneous so that the normal power is supplied to the heating element as soon as the input power line is connected to the commercial source of alternating current. The heating element is energized immediately, without any substantial delay.

The amount of power consumed by the anti-shock control device is very small. There is no significant heating of the anti-shock control device.

Due to the provision of electronic switches, the anti-shock control devices are not sensitive to variations in the ambient or atmospheric temperature. The operation of the electronic switches is substantially independent of variations in the ambient temperature. Thus, there is no need for temperature compensation.

The present invention provides anti-shock control devices which are simple, compact and trouble-free. The solid state switching components provide a high degree of reliability.

Various other modifications, alternative constructions and equivalents may be employed without departing from the true spirit and scope of the invention, as exemplified in the foregoing description and defined in the following claims.

I claim:
1. Electrical heating apparatus, comprising:
 the combination of a glass panel having a heating element incorporated therein,
 a power line for receiving electrical power,
 an electronic switching element having main electrodes connected between said power line and said heating element,
 said electronic switching element having a control electrode, and
 circuit means connected to said control electrode and including said heating element to render said electronic switching element conductive when the normal load current flows through said heating element while rendering said electronic switching element non-conductive in the event that an open circuit should develop in said heating element, so as to obviate any shock hazard in the event of breakage of said glass panel.

2. Apparatus according to claim 1, in which said heating element is mounted on an inaccessible surface of said glass panel.

3. Apparatus according to claim 1, in which said heating element comprises a conductive coating on an inaccessible surface of said glass panel.

4. Apparatus according to claim 1, in which said electronic switching element comprises a solid state electronic device.

5. Apparatus according to claim 1, in which said electronic switching element comprises a silicon controlled rectifier.

6. Apparatus according to claim 1, in which:
 said circuit means comprise means for deriving a biasing voltage from said power line, and
 means for applying said biasing voltage between said control electrode and one of said main electrodes through said heating element to render said electronic switching element conductive.

7. Apparatus according to claim 1, in which:
 said circuit means comprise means for deriving a biasing current from said power line, and
 means for causing said biasing current to flow between said control electrode and one of said main electrodes and through said heating element to render said electronic switching element conductive.

8. Apparatus according to claim 1, in which:
 said electronic switching element comprises a silicon controlled rectifier,
 said main electrodes comprising the anode and cathode of said rectifier,
 said control electrode comprising the gate of said rectifier,
 said rectifier and said heating element being connected across said power line with said cathode connected to said heating element.

9. Apparatus according to claim 8, in which:
 said circuit means comprise a bias supply for deriving a bias from said power line, and means for applying said bias through said heating element and between said gate and said cathode.

10. Apparatus according to claim 9, in which:
said bias supply comprises a Zener diode,
means for supplying current from the power line to said Zener diode to develop a bias voltage across said diode, and
means including a second diode connected between one side of said Zener diode and said gate,
the other side of said Zener diode being connected through said heating element to the cathode of said rectifier.

11. Apparatus according to claim 9, in which:
said bias supply comprises a transformer connected to said power line for supplying a reduced voltage, and
means including a diode for supplying the reduced voltage from said transformer to said gate.

12. Apparatus according to claim 9, in which:
said bias supply comprises a Zener diode,
means connected to the power line for developing a bias voltage across said diode, and
means for supplying the bias voltage from said Zener diode to said gate.

13. A protective control circuit, comprising:
the combination of a load device,
a power line for receiving electrical power,
an electronic switch having at least two main electrodes and at least one control electrode,
a load circuit connecting said main electrodes and said load device across said power line, and
control means including said control electrode for maintaining said electronic switch in a conductive state when load current flows through said load device while rendering said electronic switch non-conductive if an open circuit develops in said load device.

14. Apparatus according to claim 1, in which:
said electronic switching element comprises a silicon controlled rectifier having an anode and a cathode constituting said main electrodes,
a bias supply including a transformer connected between said anode and said cathode, and
means for supplying a biasing voltage from said transformer to said control electrode.

15. A control circuit according to claim 13, in which:
said control means comprise a transformer having input and output connections,
means for applying said input connection of said transformer with power from said power line, and
means for connecting said output connection of said transformer to said control electrode.

16. A control circuit according to claim 13, in which:
said control means comprise a transformer having an input circuit connected to said power line,
said transformer having an output circuit connected to said control electrode to supply a biasing voltage thereto.

17. A control circuit according to claim 13, in which:
said control means comprise a transformer having an input circuit connected to said power line,
said transformer having an output circuit, and
means connecting said output circuit to said control electrode and one of said main electrodes through said load device.

18. A control circuit according to claim 13, in which:
said control means comprise a transformer having an input circuit connected between said main electrodes,
said transformer having an output circuit connected to said control electrode.

19. A control circuit according to claim 13, in which:
said control means comprise a bias supply including a rectifier and a capacitor for developing a rectified bias voltage, and
means for applying said bias voltage between said control electrode and one of said main electrodes through said load device.

20. A control circuit according to claim 13, in which:
said control means comprise a bias supply including a rectifier and a capacitor for developing a rectified bias voltage,
a Zener diode for stabilizing said bias voltage, and
means for applying said bias voltage between said control electrode and one of said main electrodes through said load device.

21. A control circuit according to claim 10, in which said last mentioned means comprise a diode and a resistor connected in series between said Zener diode and said control electrode.

22. A control circuit according to claim 13, in which:
said control means comprise an auto-transformer connected to said power line,
said auto-transformer having a tap, and
means for connecting said tap to said control electrode.

23. A control circuit according to claim 22, in which said last mentioned means comprise a diode and a resistor connected in series.

24. A control circuit according to claim 13, in which:
said control means comprise an auto-transformer connected between said main electrodes,
said auto-transformer having a tap, and
means connected between said tap and said control electrode.

25. A control circuit according to claim 24, in which said last mentioned means comprise a diode and a protective resistor connected in series.

26. Electrical heating apparatus, comprising:
the combination of a glass panel having a heating element incorporated therein,
a power line for receiving electrical power,
an electronic switching device having main electrodes connected between said power line and said heating element,
said electronic switching device having a control electrode, and
a biasing circuit having a connection to said power line and connections to said control electrode and one of said main electrodes for developing a biasing voltage therebetween to render said electronic switching device conductive,
said biasing circuit also including said heating element as an essential component thereof whereby any break that may occur in said heating element will cause said electronic switching device to become non-conductive so as to obviate any shock hazard.

References Cited
UNITED STATES PATENTS

| | | | |
|---|---|---|---|
| 2,557,905 | 6/1951 | Burton et al. | 219—522 X |
| 2,806,118 | 9/1957 | Peterson | 219—203 |
| 2,898,433 | 8/1959 | Felt | 219—202 X |
| 3,320,407 | 5/1967 | Holmes | 219—501 |
| 3,330,942 | 7/1967 | Whitson | 219—522 |
| 3,379,859 | 4/1968 | Marriott | 219—522 |

VOLODYMYR Y. MAYEWSKY, Primary Examiner

U.S. Cl. X.R.

62—248; 219—522, 543

PO-1050
(5/69)

UNITED STATES PATENT OFFICE
CERTIFICATE OF CORRECTION

Patent No. 3,475,594      Dated October 28, 1969

Inventor(s) Daniel J. Aisanich

It is certified that error appears in the above-identified patent and that said Letters Patent are hereby corrected as shown below:

Col. 7, line 48, change "applying" to -- supplying --.

Col. 8, line 14, change "10" to -- 20 --

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents